April 3, 1951 D. H. MILLS 2,547,533

INDEXING DEVICE

Filed Aug. 25, 1945 3 Sheets-Sheet 1

Inventor
Donald Howard Mills by The Firm of Charles W. Hills Attys

Inventor
Donald Howard Mills by The Firm of Charles W. Hills Attys

INDEXING DEVICE
Filed Aug. 25, 1945 3 Sheets-Sheet 3
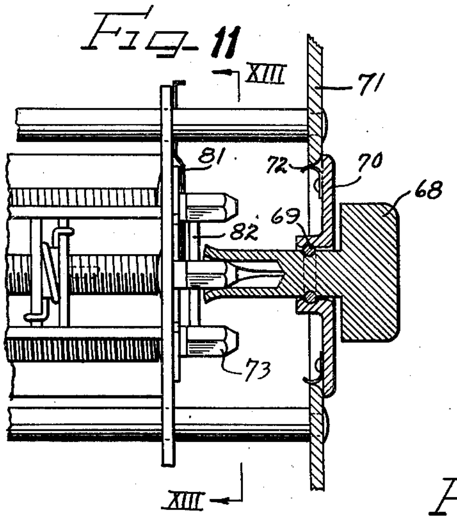
Fig-10
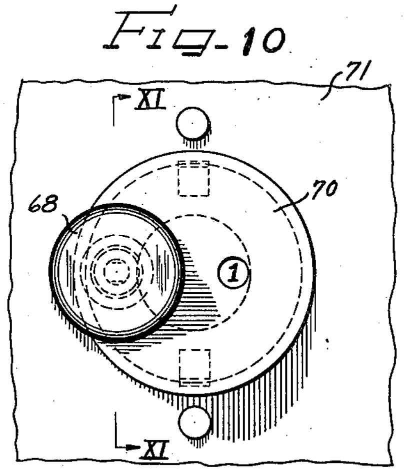
Fig-12
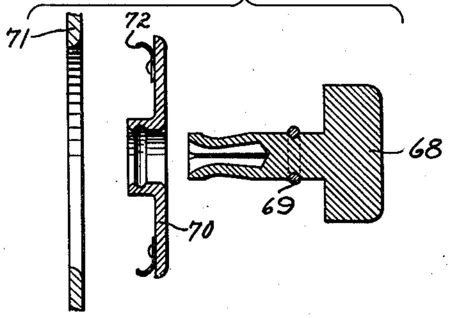
Fig-14
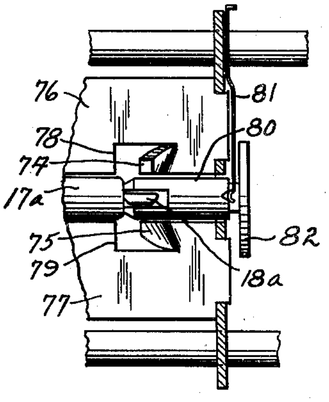
Fig-13
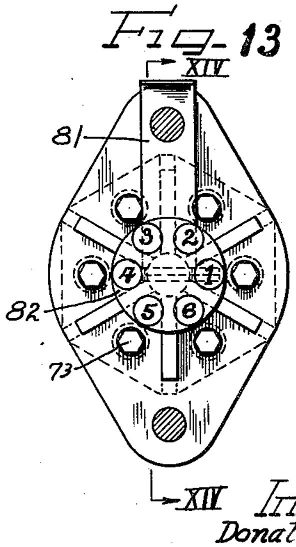
Inventor
Donald Howard Mills
by The Firm of Charles W. Hills Attys Patented Apr. 3, 1951 2,547,533

UNITED STATES PATENT OFFICE 2,547,533

INDEXING DEVICE

Donald Howard Mills, Fort Wayne, Ind.

Application August 25, 1945, Serial No. 612,687

17 Claims. (Cl. 74—10.15)

The present invention relates to control systems and apparatus of general usefulness but which are particularly suitable for tuning radio receivers.

In the past various types of antenna coupling and tuning apparatus have been employed for radio receivers. Most of such apparatus have the common objection of involving numerous parts making the apparatus bulky, heavy and intricate in construction, making it costly to manufacture and requiring appreciable energy for operation due mainly to the relatively massive movable elements involved.

It is a general object of the present invention to provide a control system and apparatus devoid of the difficulties mentioned above and of general use in a wide variety of electrical and mechanical equipment, such as power and control equipment and especially tunable apparatus such as radio transmitters and receivers.

Another object of the present invention is to provide novel apparatus for controlling an electrical circuit.

Another object of the present invention is to provide preset tuning apparatus especially adapted for use in compact radio equipment such as automobile radios and low cost portable radios suitable for home use.

A more specific object of the present invention is to provide a novel means for tuning a radio receiver to any one of a plurality of predetermined stations.

A still further object of the present invention is to provide a novel adjusting device for selective adjustment of any one of a plurality of tuning positions at will, which adjustment is free from drift or backlash normally caused by frequent, successive operations of the device.

A still further object of the present invention is to provide a novel tuning apparatus that is relatively simple in construction and that involves relatively few and small parts making the apparatus light in weight and compact so as to make it especially adaptable for auto, aircraft and portable radios.

A still further object of the present invention is to provide radio tuning apparatus involving simple parts which are inexpensive to manufacture requiring low tooling costs and not requiring accurate machine work to close tolerance and wherein loose fitting parts and play between parts do not affect accuracy of tuning.

A still further object of the present invention is to provide control apparatus particularly adapted for tuning radio apparatus, which control apparatus has a movable or indexing member of relatively low mass therefore requiring minimum manual energy for tuning.

A further object of the present invention is to provide a self contained, rigid tuning unit that may be readily coupled to a radio frequency coil assembly or similar control apparatus and which includes visual means for indicating the station tuned.

A further object of the present invention is to provide tuning apparatus involving a single pushbutton by which any one of a plurality of predetermined radio stations may be tuned in upon successive operation of such pushbutton.

A further object of the present invention is to provide control or tuning apparatus wherein the movable or indexing member is confined to a given path after the apparatus is assembled making it almost impossible to foul, thereby making the apparatus extremely reliable in operation.

A more specific object of the present invention is to provide a radio tuner including a squirrel cage guide and a coaxially disposed indexing member adapted for camming engagement with said squirrel cage member, one of said members being held stationary while the other is reciprocated relative thereto to effect partial rotation from one station position to the next station position.

A further object of the present invention is to provide radio tuning apparatus in which the indexing energy is manually controlled but electrically powered.

Other objects and advantages will become apparent from the following description of typical embodiments of the present invention wherein:

Figure 10 is a front view of the tuning adjusting device of a further modification shown in Figure 11.

Figure 11 is a cross-sectional view taken along line XI—XI of Figure 10.

Figure 12 is an exploded view of the tuning adjusting knob and associated parts shown in Figures 10 and 11.

Figure 13 is a front view of the squirrel cage element shown in Figure 14.

Figure 14 is a cross-sectional view taken along line XIV—XIV of Figure 13 showing a modified form of indexing device.

Figure 3:
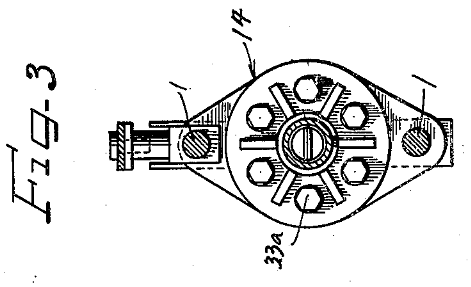
Figure 3 is a cross-sectional view taken along line III—III of Figure 1.

The various figures in the drawings disclose the invention as being embodied in radio receiving apparatus designed especially for use in a vehicle or portable radio. It should be understood, however, that the invention is not so limited and is also adapted for other applications.

Referring more particularly to Figures 1 to 4 inclusive, numeral 1 denotes a pair of guide rods rigidly mounted on suitable support means (not shown) for slidably supporting and guiding a longitudinally reciprocable element 2 normally biased towards the left, as illustrated, by return spring 3 which spring has one end secured to element 2 and the other end fixed. It will be apparent that by suitably mounting the structure on end the force of gravity may be substituted for return spring 3. By depression of a station selector pushbutton 5 against the action of spring 6 a switch 7 is closed which completes an energizing circuit through electromagnet coil 8, which circuit includes a suitable source of electrical energy such as a battery 9. As the result of electromagnetic attraction electromagnet core 10 is moved to the right pulling with it stud 11 secured thereto as well as the reciprocable element 2 which is rigidly secured to the stud 11. By means of suitable linkage such as a crank arm 12 the movable plates of an electrical condenser 13 such as of the 180° type, are partially rotated so as to tune a radio transmitter or receiver circuit having any well known tuning circuit (not shown) which includes condenser 13. It should be noted, however, that a variable inductance might be substituted for condenser 13 for tuning, or if the apparatus is to be used for other purposes than that of tuning a radio, such as, for example, to control an electrical system, the variable element of such system may be substituted for condenser 13.

An important feature of the present invention is the specific construction of the squirrel cage element 14 rotatably mounted on bearings 15 and 16 and the reciprocable indexing plunger 17 (see Figures 2, 3 and 8) rigidly secured to element 2 and having a swaged radially directed pin or portion 18. Element 14 is biased towards bearing 15 by means of spring 29. Pin 18 is adapted to be slid between successive pairs of ribs or guides 19, 20, 21, 22, 23, and 24 as the result of successive reciprocation of indexing plunger 17 by virtue of the camming action between the pin and cams such as 25, 26, 27 and 28 (see Figure 4) to be described more fully hereinafter.

Figures 1, 2, 4:
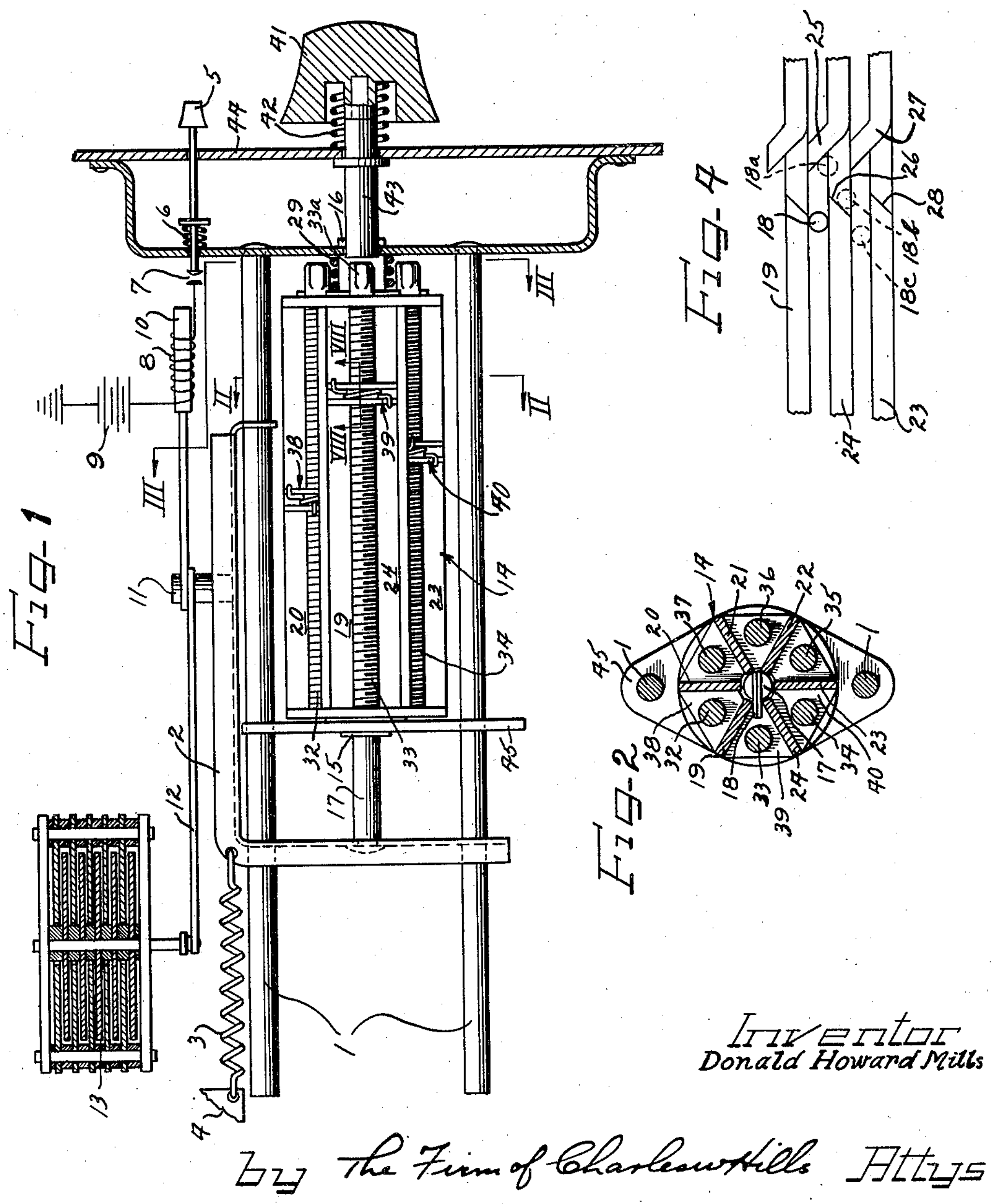
Figure 1 is a side view partly in cross section of a tuning device for a radio receiver.
Figure 2 is a cross-sectional view taken along line II—II of Figure 1.
Figure 4 is an enlarged diagrammatic view of one form of camming arrangement as viewed from the axis of plunger 17 in Figure 1.

Referring more particularly to Figure 4, which shows a development of various guides or ribs as viewed axially of plunger 17, in order to make the operation of the device more clearly understood, assume that the plunger 17 and associated pin 18 moves to the right from the full line position. As the pin 18 strikes cam 25 which is located near the end of travel of the reciprocable plunger 17 the camming action that results will cause the pin to follow the surface of cam 25 thereby slightly rotating squirrel cage element 14 until the cam 26 is in position to engage the pin 18, the position of said pin with respect to said cam being indicated by the dotted line position 18*a* which represents substantially the limit of travel of pin 18 to the right as the result of electromagnetic attraction of coil 8. As switch 7 is opened due to release of pushbutton 5 the return spring 3 causes element 2, as well as plunger 17 rigidly secured thereto, to move to the left, as illustrated, causing pin 18 to strike cam 26 formed on the end of guide 24 (see position 18*b*) to effect further rotational movement of squirrel cage element 14 until the space between the guides 24 and 23 is in registry with the pin 18, the position assumed by said guides with respect to said pin being indicated by reference character 18*c*. The pin 18 is therefore now located between the next pair of guides 24 and 23. Return spring 3 will now cause the plunger 17 to move to the left until pin 18 strikes an adjustable stop member, such as the nut portion 48 of stop member 39 illustrated in Fig. 8. By suitable longitudinal adjustment of the position of stop member 39 along screw threaded shaft 33 a predetermined degree of turning of the movable plates of condenser 13 will be effected so as to tune in a particular radio station. A plurality of stops and threaded shafts similar to 39 and 33, respectively, are peripherally disposed about the axis of plunger 17. Figure 2 shows six of such threaded shafts 32 to 37 inclusive representing six different radio stations having preset tuning although it should be understood that any other number of shafts may be used depending upon how many different radio stations are to be tuned in normally. Three of such stops 38, 39 and 40 are viewed in Figure 1 and are adjusted to different longitudinal positions along the respective threaded shafts to correspond to different frequencies of tuning, that is, different radio stations Such longitudinal adjustment of the various stop members is accomplished by depressing an adjusting knob 41 against the action of spring 42 so as to move hollow stem 43, having an hexagonal or other suitable shape of socket opening, against a similarly shaped nut portion, such as, for example, 33*a*, integral with screw shaft 33. By rotating knob 41 and together with it threaded shaft 33 the stop 39 is propelled as a carriage along shaft 33 to the desired position. Likewise other stops may be longitudinally adjusted as the corresponding threaded shaft comes into alignment with stem 43. It should be noted that stem 43 is eccentrically mounted with respect to plunger 17 and is rigidly supported by frame 44 so as to constantly align with whatever shaft assumes the position illustrated by the shaft nut portion 33*a* in Figure 3.

Each complete reciprocation or cycle by electromagnet coil 8 and return spring 3 will cause partial rotation of squirrel cage element 14 so as to move the shaft adjacent shaft 33 into registry with stem 43 and adjusting knob 41. By providing a suitable hole (not shown) in frame 44 which is in alignment with one of the nut portions other than 33*a* and by suitably marking said nut portions by numerals or station call letters it may be visually determined which nut or station represented thereby is tuned or is in alignment with adjusting nut 41 for adjustment.

Figure 9:
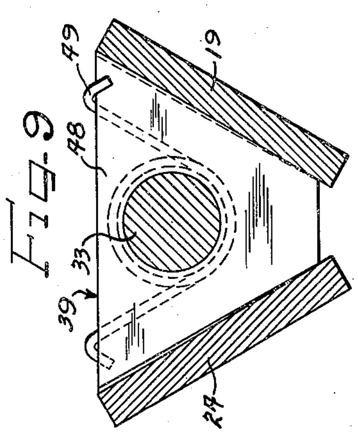
Figure 9 is an enlarged plan view of one of the stop members shown in Figures 1 and 5.
Figure 8:
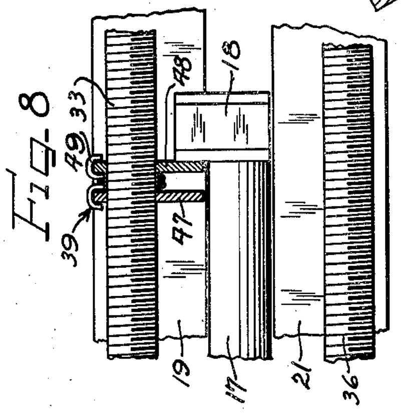
Figure 8 is an enlarged fragmentary view showing the abutting relationship between the indexing member and stop member taken along line VIII—VIII of Figure 1.

The specific construction of the various stop members is such as to provide against drift or backlash as the result of frequent reciprocation of element 2. More specifically, and referring more particularly to Figures 1, 8 and 9 showing a typical stop member 39, it will be noted that such stop member comprises a pair of substantially triangular shaped nuts 47 and 48, two sides of which correspond to the shape of the associated guides 19 and 24 so as to prevent turning of the nuts. A spring 49 having its respective ends secured to nuts 47 and 48 is maintained in a tensioned condition and tends to move the nuts apart and rotate the nuts in opposite directions against the guides 19 and 24 as stop elements. This will effect substantially a locking action between the nuts and the threaded shaft 33 so as to prevent drift of the nuts and stop member 39 as the result of constant reciprocating movement of element 2 after the stop member 39 has been adjusted. Therefore accurate tuning to different stations is maintained for long periods without the necessity of readjustment from time to time as normally required in similar devices known in the art.

As described above, successive partial rotations of the squirrel cage element 14 is achieved by reciprocating plunger 17 rigidly secured to the reciprocable element 2. Thus by depression of a single push button 5 the proper number of times to obtain the required degree of angular indexing any preset radio station may be tuned in.

An alternative embodiment of the invention is to rigidly secure the squirrel cage element against rotation and allow plunger 17 to rotate about its axis as well as to reciprocate and thus effect indexing by the camming of pin 18 against the various cams such as 25, 26, 27 etc.

Figure 5:
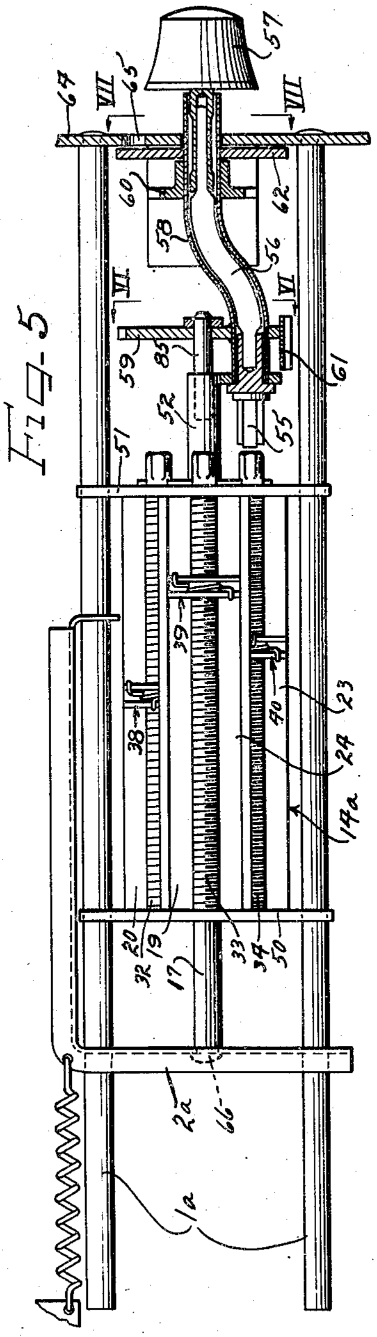
Figure 5 is a side view partly in cross-section of a modification of the radio tuner shown in Figure 1.
Figure 6:
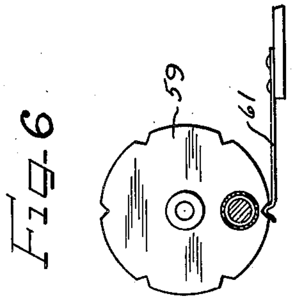
Figure 6 is a view taken along line VI—VI of Figure 5.
Figure 7:
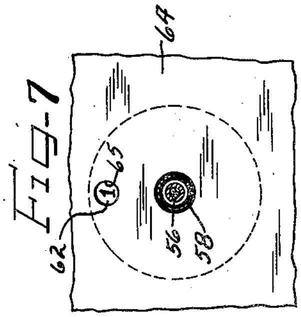
Figure 7 is a view taken along line VII—VII of Figure 5.

Such alternative embodiment is illustrated in Figures 5, 6 and 7. The squirrel cage element 14 of Figures 1, 2 and 3, instead of being rotatably mounted, is, however, rigidly secured by plates 50 and 51 to guide rods 1A. Another distinguishing feature is that plunger 17 has an end portion 66 which is journaled in reciprocable element 2*a* so as to allow successive partial rotation of the plunger about its axis as it is reciprocated and as the plunger pin is longitudinally thrust against the various cams during reciprocating movement. A sleeve 52 is loosely mounted on stub shaft 85 so that as the result of each reciprocating cycle and due to the interfitting of the right edge of pin 18 into a radial groove in the left end of sleeve 52 the sleeve is rotated in unison with plunger 17 and then held stationary after being partially rotated. Sleeve 52 is biased to the left by a spring (not shown) similar to spring 81 in Figure 14. A radially extending portion of sleeve 52 is perforated to accommodate an adjusting socket 55 secured to the end of a flexible shaft 56, the other end of the flexible shaft having rigidly secured thereto a tuning adjusting knob 57. A guide tube 58 surrounds flexible shaft 56 and is journaled in a hole extending through indexing plate 59 and in a bearing 60. Indexing plate 59 is rigidly secured to shaft 85, and has a plurality of circumferentially disposed detents (see Figure 6) adapted to engage a bent end portion of index spring 61 so as to aid in maintaining sleeve 52 in fixed angular positions after partial rotations thereof. An outstanding advantage in having the plunger 17 as the indexing member is that it has relatively light mass and requires minimum energy to reciprocate. It should be noted that the camming action takes place while pin 18 is traversing the length of the radially grooved portion of sleeve 52 similar to the construction shown in Figure 14 to be described hereinafter.

A second index plate 62 having a plurality of peripherally disposed numerals, (or station call letters) one numeral corresponding to each station, is rigidly secured to guide tube 58. The main panel 64 has an aperture 65 with which the various numerals on plate 62 are adapted to come into registry upon successive partial rotations of plunger 17 about its axis thereby giving the operator a visual indication of the station to be adjusted as will appear in Figure 7.

Figures 10 to 14 inclusive show a further modification of the invention which is similar to that shown in Figure 5 in that the squirrel cage element is held stationary and the plunger 17A is mounted so as to rotate about its axis as it is reciprocated due to camming action. Knob 68 is resiliently supported by a garter spring or plastic band 69 which fits into an annular groove in the snap-in bezel 70 which, in turn, is resiliently supported on the main panel 71 by means of spring clips 72. As will be noted in Figure 10 knob 68 is eccentrically mounted with respect to plunger 17A—also element 70 is perforated so that numerals appearing on the end of set-up screw heads 73 may be viewed to indicate the station which is selected. When it is desired to adjust the position of the stop members knob 68 is pushed in so its socket end will engage the set-up screw head aligned therewith. Different station adjustments may be made by removing element 70 and using knob 68 as a socket wrench.

Referring to Figure 14, it will be noted that laterally projecting portions 74 and 75 extending from flat plates or stampings 76 and 77, respectively, serve as the cam members 25, 27, etc. illustrated in Figure 4. Edges 78 and 79 are beveled and correspond to cams 26 and 28 in Figure 4. A position indicating member comprises a stem 80 with suitable notches for engaging the end portion of leaf spring 81 and has an integral disc portion 82 with numerals peripherally disposed thereon (see Figure 13) which may be viewed by the operator through the aperture in element 70.

Pin 18A is adapted to engage a grooved portion of stem 80 so as to rotate the stem upon reciprocation of plunger 17A so as to cause disc portion 82 to rotate with plunger 17A and thus indicate each successive tuning position. It should be noted that the camming action or indexing occurs during the time pin 18A is in transit through the grooved portion of stem 80.

As indicated previously, the invention while described as a radio tuner is also suitable for a wide variety of electrical and mechanical control applications in electrical and mechanical systems other than radio, such as semaphores, power systems and the like. Each stop member, for example, may be replaced by a switch for accomplishing a particular function in the circuit such as selecting different recordings in a "juke box" or the condenser 13 may be replaced with a multiple switch. Furthermore, while the tuning apparatus is described as operable by successive depression of a single pushbutton it may be also arranged to be operated by multiple pushbuttons if so desired. I have thus provided an efficient, self-contained, control apparatus suitable as a radio tuner and having a minimum number of simple and inexpensive parts which apparatus is extremely reliable in operation and requires a minimum amount of energy to operate in view of the relatively light movable indexing member.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. Mechanism for positioning a control comprising a squirrel cage element having a plurality of peripherally disposed guide plates having cam surfaces adjacent one end thereof, a reciprocable plunger disposed coaxially with respect to said squirrel cage element one of said elements being rotatable and the other being held from rotation, and said plunger having a radially directed portion adapted to slide between said guide plates and engage said cam surfaces to effect rotational movement of and angular indexing of said rotational element about said plunger axis and longitudinal travel of said radially directed portion between successive paths defined by said plates as the result of reciprocating movement of said plunger.

2. In a mechanism for positioning a control, the combination including a squirrel cage element having a plurality of peripherally disposed, longitudinal guide plates, a reciprocable plunger element disposed coaxially within said squirrel cage element and having a radially extending portion which is guided by said plates, cam means adjacent one end of said plates and engageable by said radially extending portion for slightly turning one of said elements about its axis as relative reciprocating motion of said elements is effected in one direction, and a second cam means also engageable with said portion to effect further slight turning of the same element about its axis as relative reciprocating motion of said elements is effected in an opposite direction.

3. In a mechanism for positioning a control, the combination including a squirrel cage element having a plurality of peripherally disposed longitudinal guide plates, a reciprocable plunger element disposed coaxially within said squirrel cage element and having a radially extending portion which is guided by said plates, said portion maintaining a constant angular relationship to its axis, cam means adjacent one end of said plates and being engageable by said radially extending portion for slightly turning said squirrel cage element about its axis as said plunger element is longitudinally moved in one direction, and a second cam means adjacent said first cam means for slightly turning said squirrel cage element further in the same direction as said plunger element is moved in an opposite direction.

4. In a mechanism for positioning a control, the combination including a squirrel cage element having a plurality of peripherally disposed, longitudinal guide plates, a reciprocable plunger element disposed coaxially with respect to said squirrel cage element and having a radially directed portion which is guided by said plates, said plunger element being rotatably mounted about its axis and said squirrel cage element being held stationary, cam means adjacent one end of said plates for engaging said radially directed portion and effecting slight rotation or indexing of said plunger about its axis as the result of reciprocation thereof.

5. In a mechanism for positioning a control, the combination including a squirrel cage element having a plurality of peripherally disposed, longitudinal guide plates, a reciprocable plunger element disposed coaxially within said squirrel cage element and having a radially extending portion which is guided by said plates, said plunger element being rotatably mounted about its axis and said squirrel cage element being held stationary, cam means for engaging said radially extending portion as said plunger is longitudinally moved in one direction to effect slight turning of said plunger about its axis, and a second cam means engageable with said portion to effect further rotation in the same direction of said plunger about its axis.

6. Mechanism for positioning a control comprising a squirrel cage element having a plurality of peripherally disposed longitudinal guide plates, a reciprocable plunger element disposed coaxially within said squirrel cage element and having a radially extending portion which is guided by said plates, said plunger element portion being fixedly mounted so said portion will retain a constant angular relationship to its axis, and said squirrel cage element being rotatably mounted, cam means engageable by said portion as said plunger element is reciprocated to effect successive partial rotations of said squirrel cage element about its axis.

7. A tuner for a radio receiver including a squirrel cage element having cam surfaces and a plurality of peripherally disposed stops, an element disposed coaxially with respect to said squirrel cage element and having a radially directed portion which is adapted to be guided by portions of said squirrel cage element and by said cam surfaces to effect indexing of one of said elements about its axis as the result of relative reciprocating movement of said elements, said stops being arranged to engage said radially directed portion to limit said reciprocating movements.

8. A tuner for a radio receiver including a squirrel cage element having a plurality of peripherally disposed, longitudinal guide plates, a plurality of stop elements, each located between a pair of said guide plates, a reciprocable plunger disposed coaxially with respect to said squirrel cage element and having a radially directed portion adapted to engage said stop elements to limit longitudinal movement of said plunger, said squirrel cage element also having cam means engageable with said radially directed portion to effect successive indexing of said plunger about its axis as the result of successive reciprocation thereof within said squirrel cage element.

9. A tuner for a radio receiver including a squirrel cage element having a plurality of peripherally disposed, longitudinal guide plates having cam surfaces adjacent one end thereof, a plurality of peripherally disposed stop elements each located between a pair of said guide plates, a reciprocable plunger disposed coaxially within said squirrel cage element and having a radially directed portion at a constant angular relationship to said plunger axis and adapted to be guided by said guide plates and cam surfaces so as to effect successive turning of said squirrel cage element about its axis as the result of successive reciprocation of said plunger therein, said stop elements being engageable by said radially directed portion to limit longitudinal movement of said plunger during reciprocation.

10. Control apparatus for an electrical circuit comprising a substantially cylindrical element having a plurality of longitudinal guide plates disposed about its periphery, a second cylindrical element coaxially disposed with respect to and surrounded by said first cylindrical element, and having a radially directed portion adapted to be guided by said plates, cam means disposed adjacent one end of said plates for co-operation with said radially directed portion when one of said elements is reciprocated relative to the other to cause relative angular indexing of said members about their axes and movement of said radially directed portion from one longitudinal path between a pair of said plates to an adjacent longitudinal path between one of said pair of plates and a different plate.

11. Radio tuning apparatus including a longitudinally reciprocable tuning element, a squirrel cage element surrounding said tuning element and having a plurality of circumferentially spaced bars and a plurality of spaced stop elements, electromagnet means for moving said tuning element in one direction, and spring means tending to move said tuning element in an opposite direction against one of said stop elements, said squirrel cage element including cam means coacting with said tuning element for guiding said tuning element into successive, adjacent longitudinal paths between said bars as the result of reciprocation of said tuning element.

12. Radio tuning apparatus comprising a squirrel cage element having a plurality of radially extending, peripherally disposed guide plates, a plurality of longitudinally extending screw threaded shafts rotatable about their axes, one located between each pair of said guide plates, a stop element screw threaded onto each of said shafts, each stop element comprising a pair of adjacent nuts each having two edges conforming to the shape of and guided by adjacent guide plates, and a spring having its ends fastened to said nuts and being tensioned so as to tend to move said nuts apart and lock them against the threads of the associated shaft in their adjusted positions as determined by the degree of rotation of said screw threaded shafts, and reciprocable tuning means co-operable with said squirrel cage element for effecting indexing and having an outstanding portion for abutting said stop elements.

13. Radio tuning apparatus comprising a squirrel cage element having a plurality of longitudinal, peripherally disposed guide plates including cam portions, and a tuning element disposed coaxially with and surrounded by said squirrel cage element and having a radially directed portion adapted to be guided by said plates and cam portions so that as the result of successive reciprocations of said tuning element said portion will follow successive adjacent longitudinal paths defined by said plates to effect angular indexing of said tuning element, indexing means operated by said tuning element and including a plurality of characters, and panel means having a perforation aligned with one of said characters to give a visual indication of the tuning of said apparatus.

14. Radio tuning apparatus comprising a squirrel cage element and a reciprocable element rotatably disposed axially thereof and co-operable therewith to effect successive indexing of said reciprocable element about its axis as the result of successive reciprocations thereof, rotatable means disposed axially of said reciprocable element and being rotatable thereby and having a plurality of peripherally disposed characters, and a panel having a perforation disposed eccentrically of said rotatable means so as to be in alignment with successive ones of said characters as said reciprocable element is indexed so as to give a visual indication of the radio station to which said apparatus is tuned.

15. Radio tuning apparatus comprising a squirrel cage element and a reciprocable element rotatably disposed axially thereof and co-operable therewith to effect successive indexing of said reciprocable element about its axis as the result of successive reciprocations thereof, said squirrel cage element having a plurality of peripherally spaced stop elements each mounted on one of a plurality of peripherally disposed screw threaded shafts for longitudinal adjustment of said stop elements, a tuning adjusting knob having a tortuous shaft with a socket at the end thereof adapted to be pushed into engagement with a head portion of any of said shafts, and a crank member disposed axially of and indexed by said reciprocable element to effect alignment of said socket with successive head portions of said shafts.

16. In a tuning apparatus, a squirrel cage element having a plurality of angularly spaced cam surfaces extending transversely of its longitudinal axis, alternate of which cam surfaces face in opposite directions, a rectilinearly movable plunger element mounted coaxially of said squirrel cage element, one of said elements being rotatable and the other being held from rotation, means selectively operable to move said plunger in one direction and other means moving said plunger in an opposite direction, and said plunger having a radially directed portion having coacting engagement with one of said cam surfaces when moving in one direction and with another of said cam surfaces when moving in an opposite direction to successively rotate one of said elements with respect to the other from one indexed position to another upon each reciprocation of said plunger.

17. In a tuning apparatus, a squirrel cage element having a plurality of angularly spaced guide plates having facing oppositely extending cam surfaces adjacent one of their ends and extending transversely of the longitudinal axis of said squirrel cage element, alternate of which cam surfaces extend into the spaces between said guide plates, a rectilinearly movable plunger element mounted coaxially of said squirrel cage element, one of said elements being rotatable and the other being held from rotation, means selectively operable to move said plunger in one direction and yieldable means urging said plunger to move in an opposite direction, said plunger having a radially directed portion slidable between said guide plates into engagement with one of said cam surfaces when moving in one direction and movable into engagement with another cam surface and into the space between the next adjacent guide plates when moving in an opposite direction.

DONALD HOWARD MILLS.

REFERENCES CITED

The following references are of record in the file of this patent:

UNITED STATES PATENTS

| Number | Name | Date |
|---|---|---|
| 95,586 | Henderson | Oct. 5, 1869 |
| 2,342,691 | Plensler | Feb. 29, 1944 |
| 2,343,219 | Marholz | Feb. 29, 1944 |